US006424365B1

United States Patent
Kimoto (10) Patent No.: US 6,424,365 B1
(45) Date of Patent: Jul. 23, 2002

(54) IMAGE FORMING APPARATUS AND METHOD OF CONTROLLING APPARATUS

(75) Inventor: Taizo Kimoto, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/811,532

(22) Filed: Mar. 20, 2001

(51) Int. Cl.$^7$ .......................... B41J 2/385; G03G 13/04; G03G 15/00
(52) U.S. Cl. .................. 347/129; 347/248; 399/401
(58) Field of Search ................. 347/133, 129, 347/229, 234, 248, 250; 399/401, 205, 51

(56) References Cited

U.S. PATENT DOCUMENTS

| 4,162,844 A | * | 7/1979 | Traister et al. | |
|---|---|---|---|---|
| 5,055,860 A | * | 10/1991 | Bannai | 347/250 |
| 5,162,857 A | * | 11/1992 | Higeta et al. | 399/401 |
| 5,708,935 A | * | 1/1998 | Rabjohns | 399/401 |
| 5,930,577 A | * | 7/1999 | Forsthoefel et al. | 399/401 |

FOREIGN PATENT DOCUMENTS

| EP | 478356 A2 | * | 4/1992 |
|---|---|---|---|
| JP | 5-046004 | | 2/1993 |
| JP | 8-267823 | | 10/1996 |
| JP | 62-257179 | * | 11/1997 |

* cited by examiner

Primary Examiner—Susan S. Y. Lee
(74) Attorney, Agent, or Firm—Foley & Lardner (57) ABSTRACT

When printing is effected on an obverse surface C1 of a copying paper sheet C, a scan position of a laser beam B on a photosensitive drum 20 is shifted by a first set amount in an axial direction of the photosensitive drum relative to a predetermined reference position. The first set amount corresponds to a positional displacement amount L1 of the copying paper sheet C, which occurs when the copying paper sheet C is first fed to the photosensitive drum 20. In addition, when printing is effected on a reverse, surface C2 of a copying paper sheet C, a scan position of the laser beam B on the photosensitive drum 20 is shifted by a second set amount in the axial direction of the photosensitive drum relative to a predetermined reference position. The second set amount corresponds to a positional displacement amount L2 of the copying paper sheet C, which occurs when the copying paper sheet C, the printing on the obverse surface of which has been finished, is fed once again to the photosensitive drum 20.

11 Claims, 6 Drawing Sheets

IMAGE FORMING APPARATUS AND METHOD OF CONTROLLING APPARATUS

BACKGROUND OF THE INVENTION

In an image forming apparatus such as a copying machine, an image on an original is read, an electrostatic latent image corresponding to the read image is formed on a surface of a photosensitive drum, the electrostatic latent image is developed into a visible image, and the visible image is printed on a copying paper sheet. A great number of copying sheets are contained in a paper feed cassette, and the copying sheets are taken out of the feed cassette one by one and fed to the photosensitive drum.

In the case of an image forming apparatus having a double-side print mode function, read images can be printed on both an obverse surface and a reverse surface of a sheet taken out of the paper feed cassette.

Specifically, in the double-side print mode, a copying sheet taken out of the paper feed cassette is fed to the photosensitive drum in the state in which the obverse surface of the sheet comes in contact with the surface of the photosensitive drum. At this time, an image read from a first original is formed as a visible image on the surface of the photosensitive drum, and the visible image is transferred onto the obverse surface of the copying sheet. The copying sheet, on which the visible image has been transferred, is separated from the photosensitive drum. The separated copying sheet is fed to a heat roller. The heat roller heats the copying sheet and fixes the image transferred on the obverse surface of the copying sheet.

The copying sheet, which has come out of the heat roller, is reversed by a sheet convey mechanism called "ADU," and returned to a convey path located upstream of the photosensitive drum. The returned copying sheet is fed once again to the photosensitive drum in the state in which the reverse surface of the sheet comes in contact with the surface of the photosensitive drum. At this time, an image read from a second original is formed as a visible image on the surface of the photosensitive drum, and the visible image is transferred onto the surface of the copying sheet. The copying sheet, on which the visible image has been transferred, is separated from the photosensitive drum. The separated copying sheet is output to an output tray via the heat roller.

When the copying sheet is conveyed and fed to the photosensitive drum, there may be a case where the position of the copying sheet is slightly displaced from a standard position (proper position) in a direction perpendicular to the direction of conveyance of the copying sheet.

In particular, in the image forming apparatus having the double-side print mode function, one copying sheet is twice fed to the photosensitive drum, and the copying sheet may be displaced each time it is fed. If the copying sheet is fed to the photosensitive drum with the displacement, the positions of images printed on both sides of the copying sheet are displaced from the proper position in the direction perpendicular to the direction of conveyance of the copying sheet.

BRIEF SUMMARY OF THE INVENTION

The object of the present invention is to provide an image forming apparatus and a method of controlling the apparatus, wherein images can always be printed on obverse and reverse surfaces of a copying paper sheet at proper positions.

The present invention provides an image forming apparatus wherein a first image is formed on an image carrying body, a paper sheet is fed to the image carrying body and thereby the first image on the image carrying body is printed on one surface of the paper sheet, and a second image is formed on the image carrying body, the paper sheet, which has come out of the image carrying body, is reversed and fed once again to the image carrying body and thereby the second image on the image carrying body is printed on the other surface of the paper sheet, the apparatus comprising:

a control section for shifting a formation position of the first image on the image carrying body by a first set amount, relative to a predetermined reference position, in a direction perpendicular to a direction of conveyance of the paper sheet; and a control section for shifting a formation position of the second image on the image carrying body by a second set amount, relative to a predetermined reference position, in the direction perpendicular to the direction of conveyance of the paper sheet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
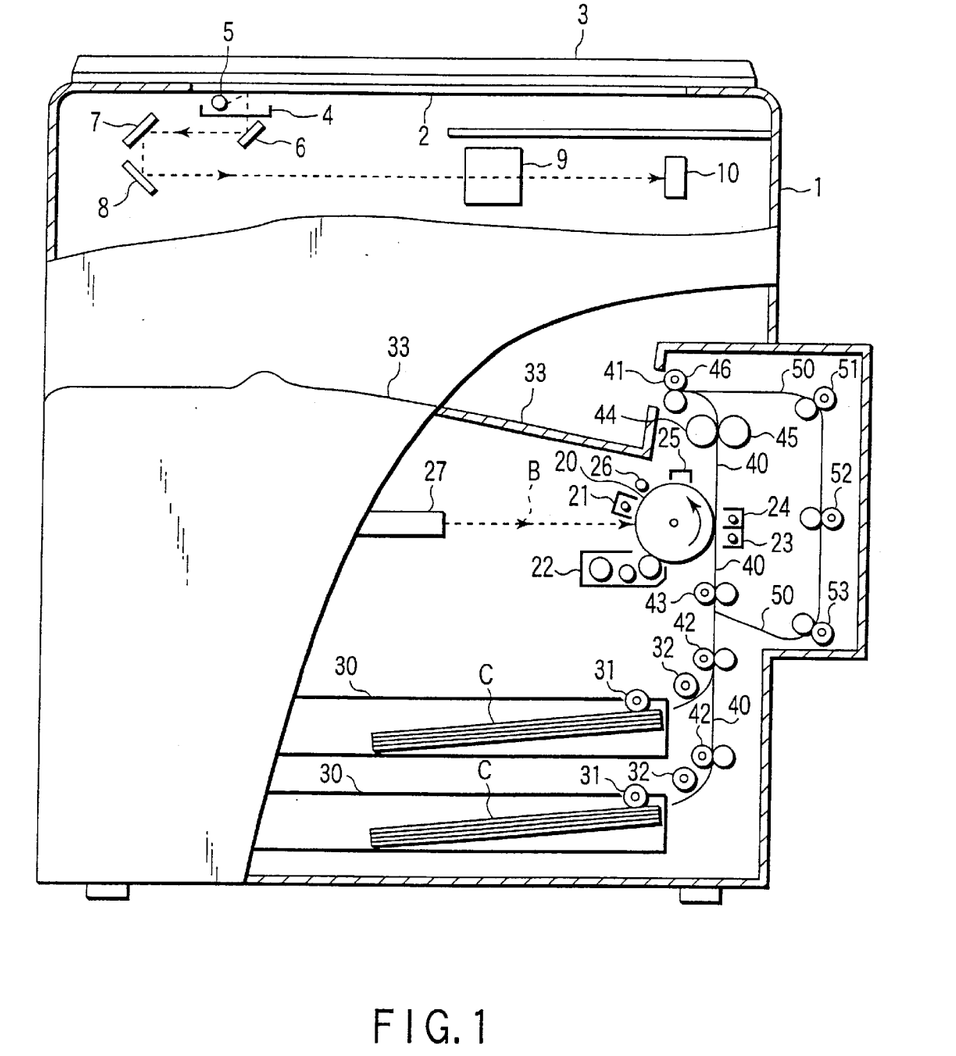
FIG. 1 shows a whole structure of an embodiment of the invention.

As is shown in FIG. 1, a transparent document table (glass plate) 2 for placement of an original is provided at an upper part of a main body 1. A cover 3 is openably provided on the original table 2.

A carriage 4 is disposed below the original table 2. An exposure lamp 5 is provided on the carriage 4. The carriage 4 and exposure lamp 5 constitute an exposure section. The carriage 4 can reciprocally move along the lower surface of the original table 2. While the carriage 4 is being reciprocally moved, the exposure lamp 5 is turned on to expose a document D placed on the original table 2.

With the exposure, a reflection light image of the original D on the original table 2 is obtained. The reflection light image is projected onto an image signal output section, e.g. a CCD (Charge Coupled Device) 10, via reflection mirrors 6, 7 and 8 and a magnification-varying lens block 9. The CCD 10 has many photoelectric conversion elements on its light-receiving region. The light-receiving region is line-scanned and the line-scanning is repeated to output an image signal corresponding to the image of the original D.

The carriage 4, exposure lamp 5, reflection mirrors 6, 7 and 8, magnification-varying lens block 9 and CCD 10 constitute a read section for optically reading the original D placed on the original table 2.

The image signal output from the CCD 10 is amplified and converted to a digital signal. The digital signal is properly processed by an image processing section and then input to a laser unit 27 functioning as an optical scan unit. The laser unit 27 produces a laser beam B corresponding to the input signal.

An image carrying body, for example, a photosensitive drum 20, is rotatably disposed within the main body 1. A charger 21, a developer 22, a transfer device 23, a separator 24, a cleaner 25 and a charge eraser 26 are successively arranged in the named order around the photosensitive drum 20. The laser beam B emitted from the laser unit 27 falls on the surface of the photosensitive drum 20 through a passage defined between the charger 21 and developer 22.

The charger 21 applies a high voltage to the photosensitive drum 20 and coats the surface of the photosensitive drum 20 with static charge. The laser beam B emitted from the laser unit 27 is radiated on the charged surface of the photosensitive drum 20.

Figure 2:
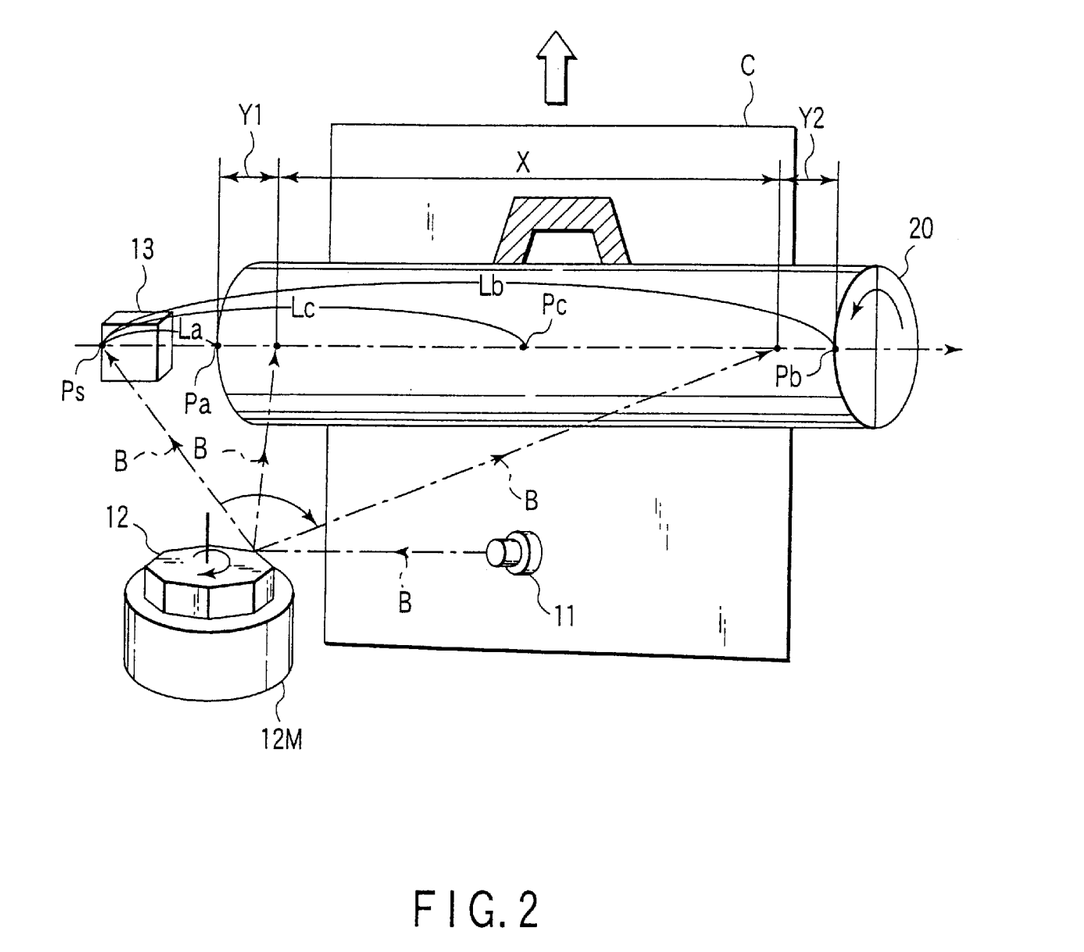
FIG. 2 illustrates a photosensitive drum according to the embodiment and scanning of a laser beam on the photosensitive drum.

As is shown in FIG. 2, in the laser unit 27, the laser beam B emitted from a semiconductor laser 11 is reflected by a rotating polygon mirror 12 onto the photosensitive drum 20. The laser beam B main-scans (line-scans) the surface of the photosensitive drum 20 from one end to the other end in the axial direction of the photosensitive drum 20, and the main scanning is repeated in accordance with the rotation of the photosensitive drum 20. The main scanning and sub-scanning effected by the repetition of the main scanning produce an electrostatic latent image, which corresponds to the read image acquired by the read section, on the surface of the photosensitive drum 20. The polygon mirror 12 is driven by a polygon motor 12M.

The range of the main scanning by the laser beam B includes a region in front of the said one end in the axial direction of the photosensitive drum 20. This region includes a reference scan position Ps of the laser beam B. A laser beam sensor 13 is disposed at the reference scan position Ps. A scan position Pa, which corresponds to the said one end in the axial direction of the photosensitive drum 20, is present at a point away from the reference scan position Ps by a predetermined distance La. A scan position Pb, which corresponds to the other end in the axial direction of the photosensitive drum 20, is present at a point away from the reference scan position Ps by a predetermined distance Lb. A scan position (hereinafter referred to as "image center position") Pc, which corresponds to the center in the axial direction of the photosensitive drum 20, is present at a point away from the reference scan position Ps by a predetermined distance Lc.

The region from the said one end to the other end of the photosensitive drum 20 includes an effective scan region (corresponding to an image formation region) X with a predetermined width having a center at the image center position Pc, a non-effective scan region Y1 with a predetermined width, which is present in front of the effective scan region X, and a non-effective scan region Y2 with a predetermined width, which is present beyond the effective scan region X. The width of the effective scan region (corresponding to the image formation region) X varies in accordance with the size of the copying sheet C. With a variation of the effective scan region X, the non-effective scan regions Y1 and Y2 will also vary.

The electrostatic latent image formed on the surface of the photosensitive drum 20 is made into a visible image by a developing agent (toner) supplied from the developer 22. The visible image is transferred onto the copying sheet C, as will be described later. The copying sheet C, on which the visible image has been transferred, is separated from the photosensitive drum 20 by the separator 24. The developing agent and charge remain on the surface of the photosensitive drum 20. The remaining developing agent is removed by the cleaner 25. The remaining charge is erased by the charge eraser 28.

Sheet feed cassettes 30 serving as paper sheet containers are provided at a bottom part of the main body 1. The sheet feed cassettes 30 contain a great number of copying sheets C of different sizes as image formation media. The copying sheets C are taken out of one of the sheet feed cassettes 30 one by one in accordance with the operation of a print key on a control panel 66 (to be described later). Each sheet feed cassette 30 is provided with a pickup roller 31 for picking up the sheets. The picked-up copying sheet C is separated from the sheet feed cassette 30 by a separation roller 32 and delivered to a first convey path 40.

The first convey path 40 begins at the position corresponding to each sheet feed cassette 30 and extends to an output port 41, located above, via the photosensitive drum 20. The output port 41 is open at an output tray 33 formed continuous with an outer peripheral surface of the main body 1.

A sheet feed roller 42 is provided for each sheet feed cassette 30 at the beginning end of the first convey path 40. A register roller 43 is provided upstream of the photosensitive drum 20 at an approximately middle portion of the first convey path 40. The register roller 43 feeds the copying sheet C between the photosensitive drum 20 and transfer device 23 at a timing associated with the rotation of the photosensitive drum 20. A heat roller 44 for thermal fixation and a pressure-contact roller 45 put in contact with the heat roller 44 are provided downstream of the photosensitive drum 20 along the first convey path 40. An output roller 46 is provided at the end of the first convey path 40.

A second convey path 50 is provided to extend from the end point of the first convey path 40 to that point on the first convey path, which is upstream of the photosensitive drum 20 and register roller 43. Paper feed rollers 51, 52 and 53 are provided along the second convey path 50.

The first convey path 40 and second convey path 50 constitute a sheet convey mechanism called "ADU" for effecting printing on both the obverse and reverse surfaces of the copying sheet C. FIGS. 3 to 10 illustrate the conveyance of the copying sheet C by means of the sheet convey mechanism.

Figure 3:
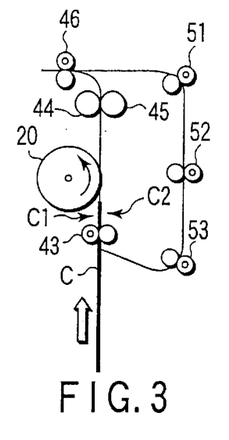
FIG. 3 to FIG. 10 illustrate conveyance of a copying sheet in the embodiment.
Figure 4:
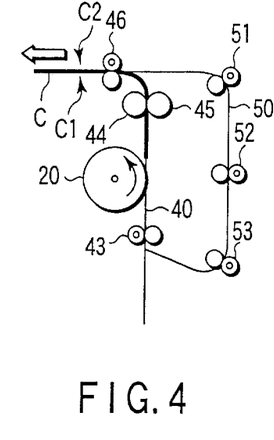
Figure 5:
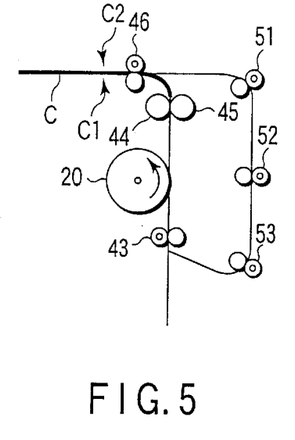
Figure 6:
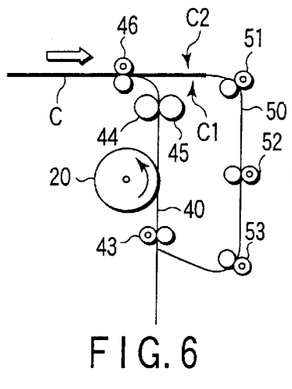

To start with, one copying sheet C is taken out of the sheet feed cassette 30. The copying sheet C is fed to the photosensitive drum 20 along the first convey path 40, as shown in FIG. 3. At this time, one surface ("obverse surface") C1 of the copying sheet C is put in contact with the surface of the photosensitive drum 20, and a first visible image formed on the surface of the photosensitive drum 20 is transferred onto the obverse surface C1 of copying sheet C. The copying sheet C, which has come out of the photosensitive drum 20, is once conveyed by the output roller 46 to be output, as shown in FIG. 4. However, as shown in FIG. 5, when the rear end of copying sheet C has passed the heat roller 44 and reached the end of the first convey path 40, the conveyance of the copying sheet C in the direction of output is stopped. Subsequently, as shown in FIG. 6, the copying sheet C is switched back and the rear end of the copying sheet C is made to enter the second convey path 50. With the switching-back, the copying sheet C is reversed.

Figure 7:
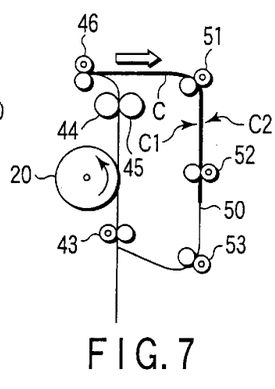
Figure 8:
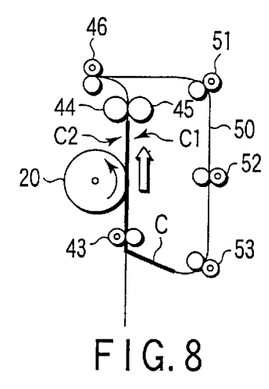
Figure 9:
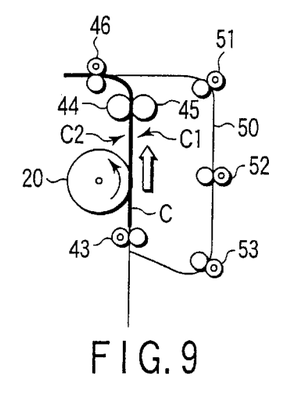
Figure 10:
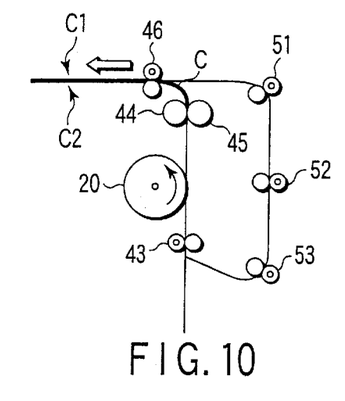

The copying sheet C, which has entered the second convey path 50 by the switching-back, proceeds along the second convey path 50, as shown in FIG. 7, and comes back to the beginning side of the first convey path 40. As is shown in FIGS. 8 and 9, the copying sheet C, which has returned to the beginning side of the first convey path 40, is fed once again to the photosensitive drum 20 along the first convey path 40. At this time, the other surface ("reverse surface") C2 of the copying sheet C comes in contact with the surface of the photosensitive drum 20. A second visible image formed on the surface of the photosensitive drum 20 is transferred on the reverse surface C2 of the copying sheet C. The copying sheet C, which has come out of the photosensitive drum 20, is output onto the output tray 33 outside the main body 1 via the output port 41 from the end of the first convey path 40, as shown in FIG. 10.

Figure 11:
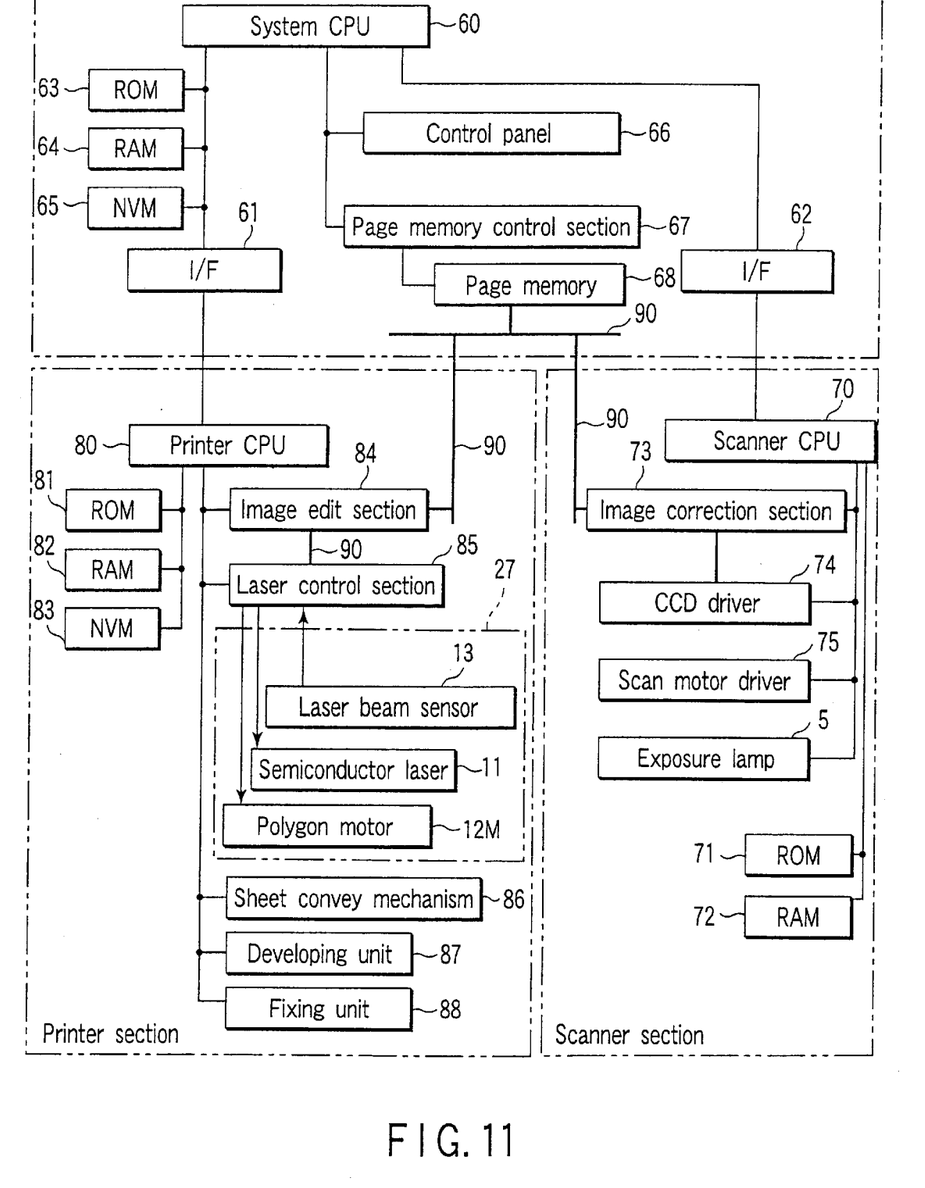
FIG. 11 is a block diagram of a control circuit in the embodiment.

FIG. 11 shows a control circuit as a whole.

A scanner CPU 70 is connected to a system CPU 70 via an interface 62, and a printer CPU 80 is connected thereto via an interface 61. The system CPU 60 controls the scanner CPU 70 and printer CPU 80 in a general way.

The system CPU 70 is connected to a ROM 63 for storing control programs, a RAM 64 for storing data, a non-volatile memory (NVM) 65, a control panel 66 and a page memory control section 67. A page memory 68 is connected to the page memory control section 67.

The scanner CPU 70 is connected to a ROM 71 for storing control programs, a RAM 72 for storing data, an image correction section 73, a CCD driver 74, a scan motor driver 75, and an exposure lamp 5. The CCD driver 74 drives the CCD 10. The scan motor driver 75 drives a scan motor for driving the carriage 4.

The printer CPU 80 is connected to a ROM 81 for storing control programs, a RAM 82 for storing data, a non-volatile memory (NVM) 83, an image edit section 84, a laser control section 85 for controlling the laser unit 27, a sheet convey mechanism 86 mainly comprising the convey paths 40 and 50, a developing unit 87 mainly comprising the developer 22, and a fixing unit 88 mainly comprising the heat roller 44. The image edit section 84 is connected to the page memory 68, image correction section 73 and laser control section 85 via an image data bus 90.

The image edit section 84 includes a control section for controlling, as a main function, the scanning of the laser beam B over the photosensitive drum 20. The data for this control is stored in the non-volatile memory (NVM) 83.

Figure 12:
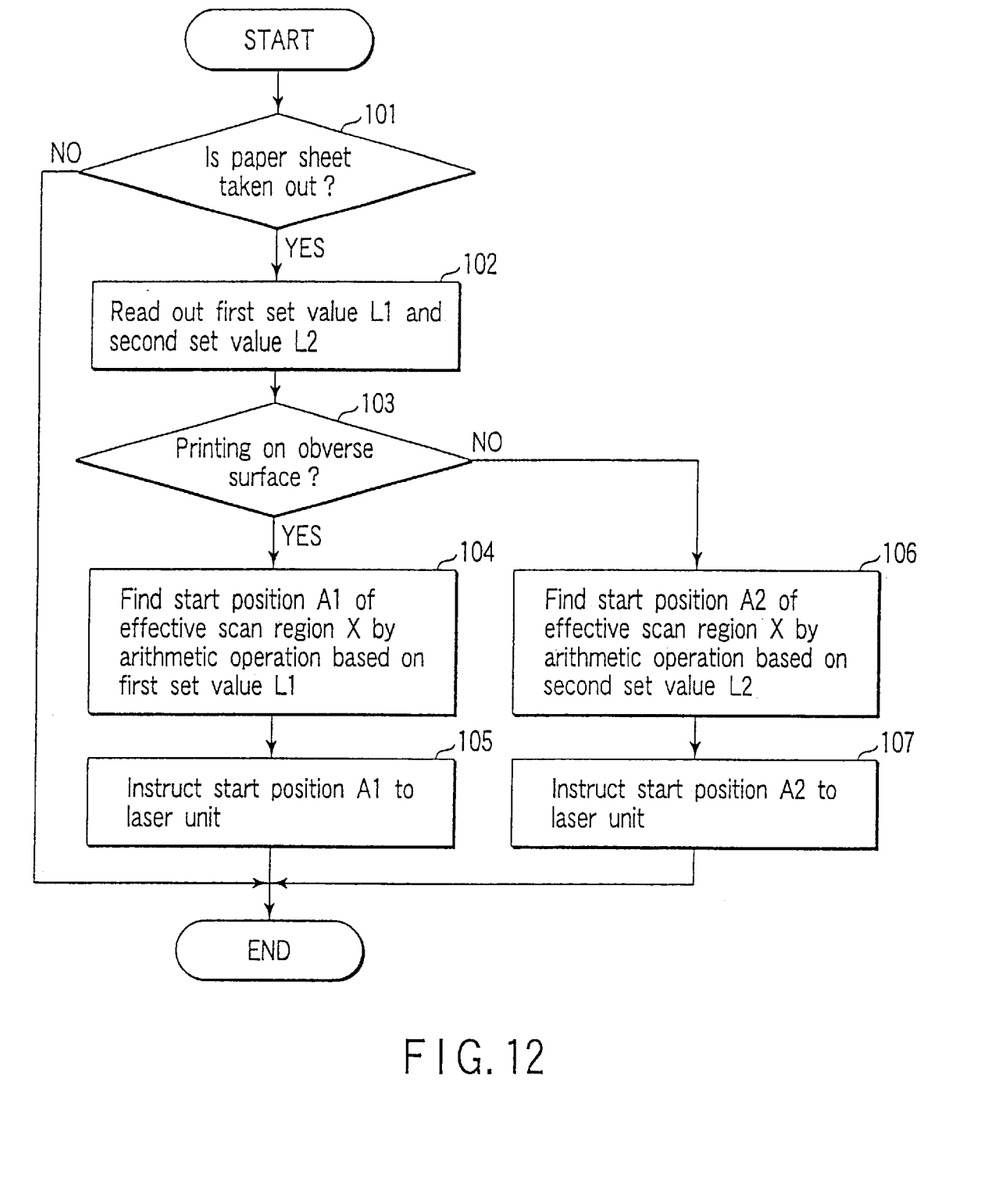
FIG. 12 is a flow chart illustrating the operation of the embodiment.

The operation will now be described with reference to a flow chart of FIG. 12.

To begin with, when a copying sheet C taken out of the sheet feed cassette 30 is first fed to the photosensitive drum 20, the obverse surface C1 of the copying sheet C is put in contact with the surface of the photosensitive drum 20. A first image (visible image), which is formed on the surface of the photosensitive drum 20, is printed on the obverse surface C1 of the copying sheet C. In this case, the copying sheet C is fed to the photosensitive drum 20 without a displacement in the direction perpendicular to the direction of conveyance.

Figure 13:
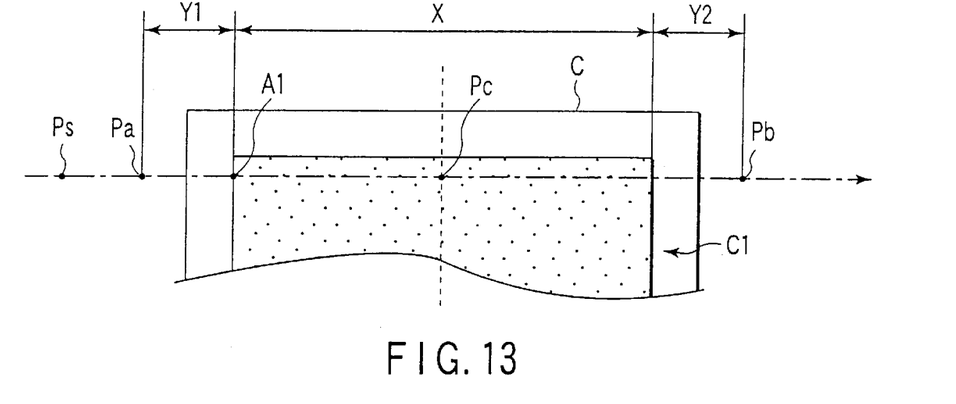
FIG. 13 shows a standard position of an effective scan region X of a laser beam B in the embodiment.

If there is no displacement of the copying sheet C in the printing on the obverse surface, the effective scan region X of the laser beam B for producing the first image (electrostatic latent image) on the photosensitive drum 20 is set at the standard position with the center at the image center position Pc, as shown in FIG. 13. Thus, the first image is formed at the standard position on the surface of the photosensitive drum 20, and this first image is printed on the obverse surface C1 of copying sheet C at a proper position.

However, since there is a variance among machines with respect to the sheet convey system, it is difficult to completely eliminate displacement of the conveyed copying sheet C. That is, when printing is effected on the obverse surface, the copying sheet C is displaced by a distance L1 in the direction perpendicular to the direction of conveyance of the copying sheet C.

Figure 14:
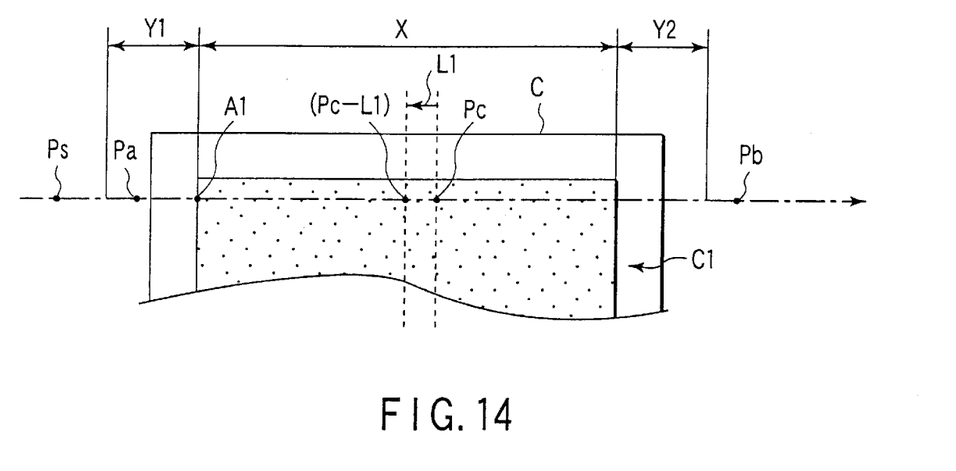
FIG. 14 illustrates correspondency between the scan position of the laser beam B and a copying sheet C in the printing on the obverse surface of the sheet in the embodiment.

Accordingly, when printing is effected on the obverse surface, the center of the effective scan region X of the laser beam B on the photosensitive drum 20 is shifted, as shown in FIG. 14, to a position (=Pc−L1), which is away from the standard image center position Pc by a first set amount (distance L1). In FIG. 14, the effective scan region X is shifted to the left of the copying sheet C. However, when the copying sheet C is displaced in the opposite direction, the effective scan region X is shifted to the right of the copying sheet C.

In this way, the first image is formed on the surface of the photosensitive drum 20 at the position shifted from the standard position by the first set amount (distance L1). The first image is printed on the obverse surface C1 of copying sheet C. Since the print position is shifted by considering the displacement amount L1 of the copying sheet C in advance, the print position accords with the proper position as a result.

The copying sheet C, on which the first image has been printed, is reversed by the sheet convey mechanism and fed once again to the photosensitive drum 20.

The reverse surface C2 is then put in contact with the surface of the 20. A second image (visible image), which is formed on the surface of the photosensitive drum 20, is printed on the reverse surface C2 of the copying sheet C. In this case, the copying sheet C is displaced by a distance Ln while it is reversed by the sheet convey mechanism and fed once again to the photosensitive drum 20. With the displacement, the copying sheet C is conveyed to the photosensitive drum 20. If printing is effected in this state, the second image would be printed on the reverse surface C2 of copying sheet C with a displacement from the proper position on the reverse surface C2.

Figure 15:
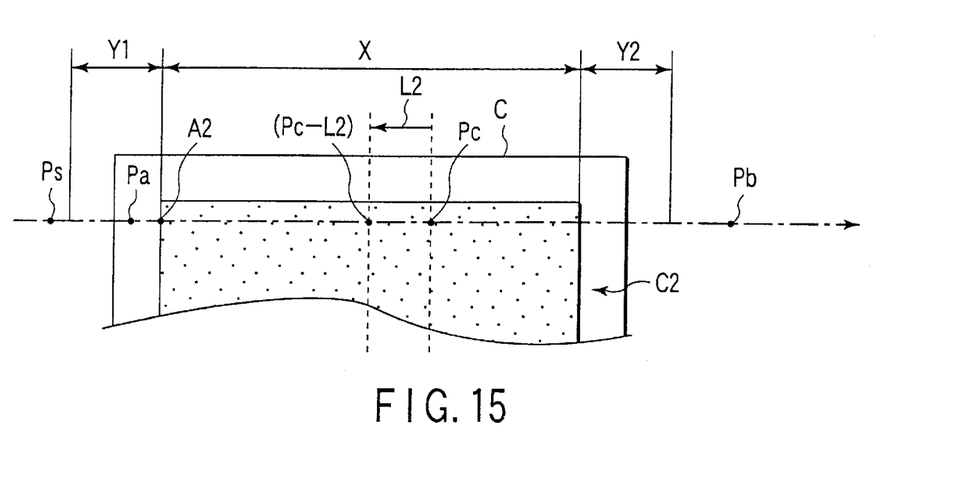
FIG. 15 illustrates correspondency between the scan position of the laser beam B and the copying sheet C in the printing on the reverse surface of the sheet in the embodiment.

Thus, when printing is effected on the reverse surface, the center of the effective scan region X of the laser beam B on the photosensitive drum 20 is shifted, as shown in FIG. 15, to a position (=Pc−L2), which is away from the standard image center position Pc by a second set amount (distance L2). The second set amount (distance L2) is equal to a sum (L2 =L1+Ln) of the displacement amount L1 occurring in the printing on the obverse surface and the displacement amount Ln occurring while the copying sheet C, the printing on the obverse surface of which has been finished, is reversed and fed once again to the photosensitive drum 20.

Accordingly, the second image is formed on the surface of the photosensitive drum 20 at the position shifted from the standard position by the second set amount (distance L2). The second image is printed on the reverse surface C2 of copying sheet C. Since the print position is shifted by considering the displacement amount L2 of the copying sheet C in advance, the print position accords with the proper position as a result.

The displacement amounts L1 and L2 of the copying sheet C and the directions of displacement are substantially inherent in individual machines. In addition, since the number of feed rollers associated at a time with one copying sheet C varies depending on the size of copying sheet C, the displacement amounts L1 and L2 of the copying sheet C differ from size to size of copying sheets C.

At the time of shipment of the main body 1, the displacement amounts L1 and L2 of copying sheet C and the directions of the displacement are actually measured by a person in charge. The measured displacement amount L1 is stored in the non-volatile memory 83 as the first set amount and the measured displacement amount L2 is stored as the second set amount with respect to the respective sizes of copying sheets C.

When the copying sheet C has been taken out of the sheet feed cassette 30 (YES in step 101), the image edit section 84 reads out the first set value L1 and second set value L2 corresponding to the size of the taken-out copying sheet C from the non-volatile memory 83 (step 102).

When printing is effected on the obverse surface C1 of copying sheet C (YES in step 103), the image edit section 84 calculates a start position (scan position of laser beam B) A1 of the effective scan region X on the photosensitive drum 20 on the basis of the read-out first set value L1 (step 104), and controls the laser unit 27 on the basis of the start position A1 (step 105).

When printing is effected on the reverse surface C2 of copying sheet C (NO in step 103), the image edit section 84 calculates a start position (scan position of laser beam B) A2 of the effective scan region X on the photosensitive drum 20 on the basis of the read-out second set value L2 (step 106), and controls the laser unit 27 on the basis of the start position A2 (step 107).

The start positions A1 and A2 of the effective scan region X are found by the following arithmetic operations.

When an image write resolution of the laser beam B is D [mm/dot], the width of the copying sheet C is W [mm] and the length of the left margin (left void amount) on the copying sheet C is R [dot], A1 [dot]=Pc−(W/2)/D+R−L1

A2 [dot]=Pc−(W/2)/D+R−L2.

In the above equations, the set amount L1, L2 is subtracted. This exemplifies cases where the effective scan region X is shifted to the left of the copying sheet C, as shown in FIGS. 14 and 15. Where the direction of displacement of the copying sheet C is opposite, the set amount L1, L2 is added and the effective scan region X is shifted to the right of the copying sheet C.

As has been described above, the positions of formation of the first and second images on the photosensitive drum 20 are shifted in accordance with the displacement amounts L1 and 12 of the copying sheet C. Thereby, the image can always be printed at the proper position on each of the obverse and reverse surfaces of the copying sheet C.

Furthermore, since consideration has been given to the fact that the displacement amount L1, L2 varies from size to size of copying sheets C, images can always be printed at proper positions irrespective of the size of the copying sheet C.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An image forming apparatus wherein a first image is formed on an image carrying body, a paper sheet is fed to the image carrying body and thereby the first image on the image carrying body is printed on one surface of the paper sheet, and a second image is formed on the image carrying body, the paper sheet, which has come out of the image carrying body, is reversed and fed once again to the image carrying body and thereby the second image on the image carrying body is printed on the other surface of the paper sheet, the apparatus comprising:

a control section for shifting a formation position of the first image on the image carrying body by a first set amount, relative to a predetermined reference position, in a direction perpendicular to a direction of conveyance of the paper sheet; and a control section for shifting a formation position of the second image on the image carrying body by a second set amount, relative to a predetermined reference position, in the direction perpendicular to the direction of conveyance of the paper sheet.

2. The apparatus according to claim 1, wherein said first set amount corresponds to a positional displacement amount of the paper sheet, which occurs in the direction perpendicular to the direction of conveyance of the paper sheet when the paper sheet is first fed to the image carrying body, and said second set amount corresponds to a positional displacement amount of the paper sheet, which occurs in the direction perpendicular to the direction of conveyance of the paper sheet when the paper sheet, which has come out of the image carrying body, is reversed and fed once again to the image carrying body.

3. The apparatus according to claim 1, wherein said control sections store plural kinds of said first set amounts and said second set amounts in accordance with sizes of paper sheets, and select one of said plural kinds in accordance with the size of the paper sheet.

4. An image forming apparatus comprising:

a photosensitive drum;

a scan unit for optically scanning the photosensitive drum in an axial direction of the photosensitive drum, and repeating the scanning in accordance with rotation of the photosensitive drum, thereby forming an image on the photosensitive drum;

a paper sheet container for containing paper sheets;

a sheet convey mechanism for taking out the paper sheet from the paper sheet container and feeding the paper sheet to the photosensitive drum, thereby to print a first image formed on the photosensitive drum on one surface of the paper sheet, and reversing the paper sheet, which has come out of the photosensitive drum, and feeding the paper sheet once again to the photosensitive drum, thereby printing a second image formed on the photosensitive drum on the other surface of the paper sheet;

a control section for shifting, when the first image is to be formed on the photosensitive drum, a scan position of the scan unit on the photosensitive drum by a first set amount in the axial direction of the photosensitive drum relative to a predetermined reference position; and a control section for shifting, when the second image is to be formed on the photosensitive drum, the scan position of the scan unit on the photosensitive drum by a second set amount in the axial direction of the photosensitive drum relative to a predetermined reference position.

5. The apparatus according to claim 4, wherein said first set amount corresponds to a positional displacement amount of the paper sheet, which occurs in the direction perpendicular to the direction of conveyance of the paper sheet when the paper sheet is first fed to the photosensitive drum, and said second set amount corresponds to a positional displacement amount of the paper sheet, which occurs in the direction perpendicular to the direction of conveyance of the paper sheet when the paper sheet, which has come out of the photosensitive drum, is reversed and fed once again to the photosensitive drum.

6. The apparatus according to claim 4, wherein said control sections store plural kinds of said first set amounts and said second set amounts in accordance with sizes of paper sheets, and select one of said plural kinds in accordance with the size of the paper sheet.

7. The apparatus according to claim 4, wherein said sheet convey mechanism comprises a first convey path extending from the paper sheet container via the photosensitive drum, and a second convey path extending from an end point of the first convey path to a point on the first convey path, which is located upstream of the photosensitive drum, wherein the paper sheet taken out of the paper sheet container is fed to the photosensitive drum along the first convey path, the paper sheet, which has come out of the photosensitive drum, is switched back at the end point of the first convey path and thus made to enter the second convey path, the paper sheet is then returned from the second convey path to the first convey path, the returned paper sheet is fed once again to the photosensitive drum along the first convey path, and the paper sheet, which has come out of the photosensitive drum, is output from the end point of the first convey path.

8. The apparatus according to claim 4, wherein said scan unit scans the photosensitive drum with a laser beam.

9. The apparatus according to claim 4, further comprising:

a developer for developing and visualizing the image formed on the photosensitive drum;

a transfer device for transferring the image formed on the photosensitive drum onto the paper sheet; and a heat roller for thermally fixing the image transferred on the paper sheet, which has come out of the photosensitive drum.

10. The apparatus according to claim 4, further comprising:

an original table for placement of an original; and a read section for reading an image of the original placed on the original table by optically scanning the original on the original table.

11. A method of controlling an image forming apparatus wherein a first image is formed on an image carrying body, a paper sheet is fed to the image carrying body and thereby the first image on the image carrying body is printed on one surface of the paper sheet, and a second image is formed on the image carrying body, the paper sheet, which has come out of the image carrying body, is reversed and fed once again to the image carrying body and thereby the second image on the image carrying body is printed on the other surface of the paper sheet, the method comprising:

a step of shifting a formation position of the first image on the image carrying body by a first set amount, relative to a predetermined reference position, in a direction perpendicular to a direction of conveyance of the paper sheet; and a step of shifting a formation position of the second image on the image carrying body by a second set amount, relative to a predetermined reference position, in the direction perpendicular to the direction of conveyance of the paper sheet.

* * * * *